Figure 1:
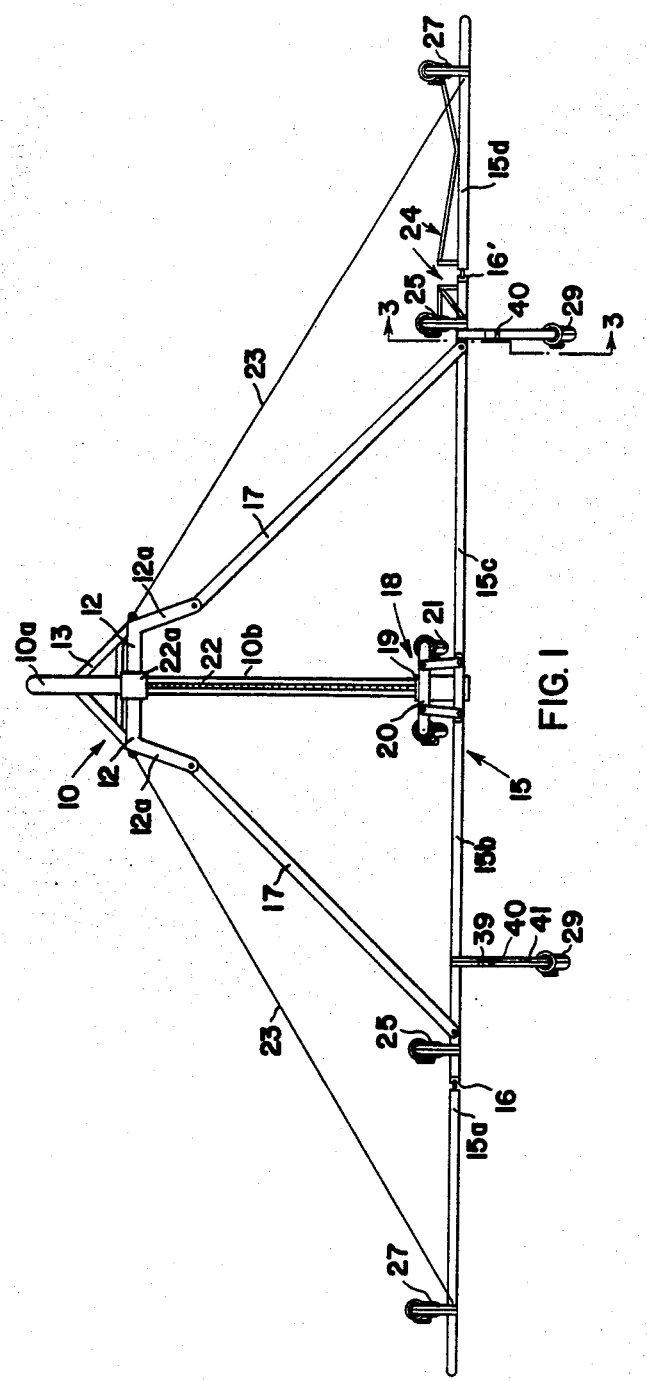

United States Patent [19]

Lechler et al.

[11] 4,138,134

[45] Feb. 6, 1979

[54] FOLDING HARROW FRAME

[76] Inventors: Friedrich W. Lechler; Edwin F. Lechler; Herbert A. Lechler, all of Box 2, Middle Lake, Saskatchewan, Canada

[21] Appl. No.: 862,777

[22] Filed: Dec. 21, 1977

[30] Foreign Application Priority Data

Dec. 22, 1976 [CA] Canada .................................. 268505

[51] Int. Cl.² ..................... B62D 53/00; A01B 73/00
[52] U.S. Cl. .................................. 280/411 A; 172/311
[58] Field of Search .................. 280/639, 656, 411 A, 280/411 R, 411 B; 172/311, 456, 662

[56] References Cited

U.S. PATENT DOCUMENTS

| | | | |
|---|---|---|---|
| 3,960,221 | 6/1976 | Blair et al. | 172/311 |
| 3,982,773 | 9/1976 | Stuffebeam | 172/456 |
| 4,056,148 | 11/1977 | Blair | 280/411 A |
| 4,066,274 | 1/1978 | Adee | 280/411 A |
| 4,088,346 | 5/1978 | Schreiner | 280/656 |

*Primary Examiner*—Robert R. Song
*Attorney, Agent, or Firm*—Otto John Munz

[57] ABSTRACT

A foldable frame for agricultural implements, for example harrows, includes a draw bar having a rear extension and two side members rigid with the draw bar, an elongated support beam for carrying the agricultural implements, the beam having two side portions pivotably connected to each other at the center of the beam for folding in a horizontal plane, and two links, each pivotably connected at a front end to the draw bar side members, and pivotably connected at their rear ends to a central part of the two beam portions. The center of the beam is mounted on a sub-frame movable along the rear extension of the draw bar, this sub-frame being movable from a rear position in which this sub-frame and the links hold the two beam portions extended and aligned with each other to give a wide frame for holding the implements, and the sub-frame is movable forwardly along the draw bar extension to cause the beam portions to fold backwards from their connection with the sub-frame, until they reach a folded condition in which they extend rearwardly from the sub-frame when this is close to the front end of the draw bar.

12 Claims, 4 Drawing Figures

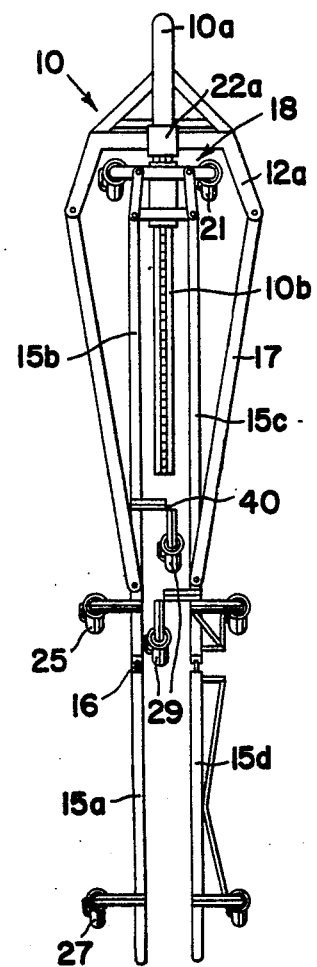
FIG. 2
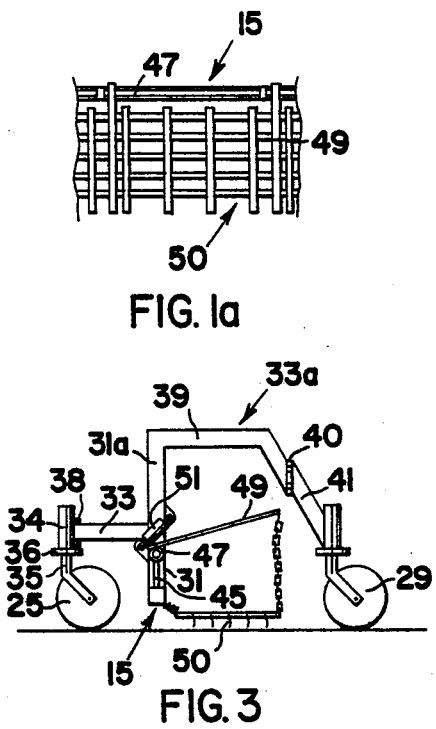
FIG. 1a
FIG. 3

FOLDING HARROW FRAME

The present invention relates to a frame for mounting agricultural implements, for example harrows, and which is foldable from an extended working condition, to a narrow travelling condition.

In some kinds of agricultural work it is desirable to use a foldable frame which includes a very wide equipment supporting beam, so that this can move agricultural implements over a wide path, for example 100 feet or more in width. Obviously, such a frame must be folded for travelling, to allow this to pass through gates.

Various designs of foldable frames for harrows and other implements have been proposed. In some of these the implement supporting beam, which extends perpendicularly to the direction of movement of the frame in normal operation, is made foldable by having two side portions hinged to a central portion, these side portions being hinged back from the central portion for folding of the frame. Examples of such designs are shown in U.S. Pat. Nos. 2,828,597, issued Apr. 1, 1958 to Moore, 3,548,954, which issued Dec. 22, 1970 to Lindemann et al, and 3,654,999, which issued Apr. 11, 1972 to Fischer. A draw back of such designs is that, since the central part of the beam remains stationary relative to the draw bar, the rear ends of the beam portions, in the folded condition, are along way behind the front of the draw bar, given a vehicle of large overall length.

In other designs, for example those of U.S. Pat. Nos. 3,791,673, which issued Feb. 12, 1974 to Hornung, and 3,493,247 which issued Feb. 3, 1970 to Tasset et al, the beam is divided into three sections, and during folding the central part again remains stationary relative to the draw bar while the end portions are folded forwardly. In this design the width of the beam is limited since the folding end portions must be short enough to fold into place behind the front of the draw bar.

The present invention provides a foldable frame of novel geometry, and which can be folded into a position in which the folded beam sections extend from a front position fairly near the front of the draw bar to a rear position which is further behind the front of the draw bar than is the normal beam position during agricultural operation. A long beam can therefore be folded without causing the folded beam to extend unduly far behind the front of the draw bar.

Basically, the present invention provides a foldable frame in which the support beam is in two sections or side portions, pivotably connected at the center of the beam for folding together into side-by-side relationship in the horizontal plane. Two links are provided, each pivotably connected at a front end to the draw bar and at a rear end to a central part of a respective beam portion. Also, means are provided connecting the center of the beam to the draw bar, these connecting means allowing the center of the beam to be held so spaced from the draw bar that the beam is in the extended working position with its side portions substantially aligned with each other, these connecting means also allowing movement of the center of the beam in a fore and aft direction relative to the draw bar to cause folding of the beam portions about the rear ends of the links, whereby in the folded condition the beam portions extend substantially rearwardly from the draw bar.

Folding can be achieved at least partly by remote control by providing powered means for moving the center of the beam fore and aft relative to the draw bar. Preferably, the center of the beam is moved forwardly from the beam extended, working condition, to bring the beam center into a position in which this is fairly close behind the front of the draw bar, and preferably close to the front pivot points of the two links.

The invention will be described in detail with reference to the accompanying drawings, in which:

FIG. 1 shows a plan view of the agricultural implement frame in the working condition, FIG. 1a shows detail of a small portion of the beam of the frame of FIG. 1, FIG. 2 shows a plan view of the same frame when folded for travelling, FIG. 3 shows a sectional elevation on lines 3—3 of FIG. 1.

Referring firstly to FIG. 1, the frame includes a draw bar 10 having a front end 10a intended to be hitched on to a tractor vehicle. The draw bar has two side members 12, which extend from the sides of the draw bar, outwardly and rearwardly at an angle of about 45° to the draw bar, these side extensions being braced by a gussett members 13. Rearward portions 12a extend from the ends of side members 12, at a small angle to the draw bar direction. The draw bar 10 also has a rear extension 10b, extending in a fore and aft direction back to a main equipment support beam 15 of the frame.

The rear end of the draw bar extension 10b is supported by a wheeled sub frame 18, having a central, tubular part 19 which is slidable forwardly and rearwardly along the draw bar extension 10b, and which carries a transverse member 20. The ends of the member 20 are supported by wheels 21, which are mounted by a caster arrangement to allow the subb frame 18 to steer when the frame is folded for travelling. In operation in the field, a locking pin (not shown) is used to lock the wheels 21 in the fore-and-aft position. The member 19 is arranged to be moved along the draw bar extension 10b by means of a continuous chain 22 moved by power means including a hydraulic motor and sprocket wheel, these being mounted at the front end of the draw bar and being indicated generally at 22a.

The beam 15 is composed of four rigid sections, namely sections 15a, 15b, 15c, and 15d, giving a total beam length of well over 100 feet. The two sections 15a and 15b, which compose the left hand side portion of the beam, are hingedly connected at 16, with the outer section 15a being slightly shorter than the inner section 15b. The sections 15c and 15d are similarly connected by hinge 16', the hinges 16 and 16' allowing the outer sections or wings 15a and 15d to follow the contour of the land, and also allowing some relative movement in the horizontal plane between the attached sections. Links 17 connect the rear ends of the side member extensions 12a of the draw bar to an outer end portion of each of the inner beam sections 15b and 15c, the links being hingedly connected at each of their ends to allow movement of the links relative to the draw bar and to the beam in a horizontal plane. The connection points between the links and the beams are close to the center of the side portions of the beams. In addition, cables 23 connect the draw bar side members 12 to outer end portions of the outer beam sections 15a and 15d. The parts of the beam sections adjacent the hinges 16 and 16' are strengthened by a lattice bracing indicated at 24, which, for simplicity, is illustrated only in the right hand portion of FIG. 1. This bracing is designed to prevent distortion of the wing sections 15a and 15d in backwards movement of the beam.

The beam 15 is supported above the ground at its center by the sub frame 18, and each side portion of the beam is additionally supported by front wheels 25 and 27 and rear wheels 29. The front wheels 25 and 27 are symmetrically placed on the side portions of the beams, with the inner front wheel 25 disposed just inside the hinge 16 and 16', and outside the connection with link 17, and the outer front wheels 27 are disposed on the outer end portions of the beam sections 15a and 15d, just outside the connection point with cables 23. The rear wheels 29 are however asymmetrically arranged, so that these do not interfere with each other during folding, the rear wheel on the right hand side being just outside the point of connection with link 17, whereas the rear wheel on the left hand side is spaced inside the connection point with this link.

The mounting arrangements for the wheels 25 and 29 are shown in FIG. 3. For the front wheel 25, the arrangement includes a vertical pillar 31 extending up from the beam 15, and a forwardly extending support 33 carrying a bearing 34 for a vertical spindle 35 of a caster wheel bracket holding the wheel 25. The bracket is solid with a disc 36 which rotates under the bearing 34, and has a hole which receives a locking pin 38 used to lock the wheel in position for towing in the folded condition. For the rear wheel 29 there is provided a vertical pillar 31a which is higher than pillar 31, and a "bridgeover" portion 33a which is high and wide enough to bridge over harrow implements or other agricultural implements intended to be carried by the beam 15. The bridgeover 33a includes a horizontal portion 39 connected to pillar 31a, and having a vertical hinge 40 at its rear end mounting a downwardly sloping portion 41, which carries a bearing for a caster wheel bracket similar to that used with the front wheel, but without any locking pin. The wheel supports for wheels 27 are identical to those shown for wheels 25, and also have locking pins for holding the caster wheels in position.

FIG. 3 also shows, in association with FIG. 1a, how harrow implements indicated generally at 50 can be attached to the beam 15, it being understood that quite different implements may be attached as required. As shown, small brackets 45 rising from beam 15 carry a rotatable pipe 47, one pipe being provided for each of the beam sections, these pipes being termed "lift bars", and carrying a series of rearwardly extending lift arms 49. The lift bar for each section is rotated by a hydraulic cylinder 51 connected to a bracket held by the pillar 31a, so that extension of the cylinder causes lifting of the lift arms. The outer end of lift arms are connected by chains to the harrows, these also being directly connected to the beams at their front ends, so that the cylinder 51 can control the engagement of the harrows on the ground.

In operation, the frame can be pulled over the ground by a tractor attached to the front end 10a of the draw bar, with the beam extended as shown in FIG. 1, and with the front caster wheels 25 and 27 of the beam in unlocked position, and with the caster wheels 21 of the sub frame 18 locked in position. The wheel arrangement, particularly the provision of the rear wheels on the bridgeovers and the fore-and-aft separation between wheels 25 and 29, and the arrangement of hinges 16, gives good following of the contours of uneven land. The bridgeover portion 41 is free to move about the hinge 40 during normal operation. The tractor has a supply of pressurized hydraulic fluid used for operating the hydraulic motor of unit 22a, and also the lift cylinders 51 which control the implements.

For folding of the frame into the position shown in FIG. 2, the caster wheels 21 are unlocked so that all caster wheels are in unlocked condition, and the cables 23 are unhooked. The frame may be backed up a little to slacken the cables 23 prior to unhooking. The tractor is then driven ahead, and simultaneously the hydraulic motor of unit 22a is operated to move the attached chain, this and the forward motion of the tractor bringing the sub frame 18 from the rear of the draw bar extension 10b, up to a position near the front as shown in FIG. 2, as the side beam portions swing backwards about the rear ends of links 17. At the same time, the caster wheels 25, 27, and 29 pivot as necessary to allow this movement of the beam, and in addition the bridgeovers hinge at the hinges 40 until the outer bridgeover portions 41 are perpendicular to the inner portions 39 of the bridgeover. Thus, the position shown in FIG. 2 is reached. The asymmetrical arrangement of the bridgeovers ensure that these lie one behind the other without interference, the support 33a of the rearmost bridgeover being spaced above the caster wheel portion of the forward bridgeover.

Once the folding is complete, the operator stops and lock wheels 25 and 27, with wheels 21 remaining unlocked, so that the frame can be pulled as a trailer with wheels 21 steering.

For unfolding the frame into operational position, the operator locks wheels 21, unlocks wheels 25 and 27, and manually pushes apart the wings of the beams several feet. He can then spread the wings further apart by backing up, sufficient to hook up the cables 23. The frame can then be unfolded into the working position by simultaneously driving ahead and operating the hydraulic unit 22a to move the sub frame 18 to its rearward position on the draw bar extension 10b.

It will be seen that in the folded condition the beam portions occupy most of the length of the folded vehicle (i.e. at least ¾ of the length and preferably more than 80% of the total vehicle length), so that the overall length of the folded vehicle is little more than twice the beam length. The folded vehicle is also relatively narrow. It will be seen that the hinged arrangement of the bridgeovers allows the beam portions to be folded fairly close together without the bridgeovers interfering with each other. At the same time, the construction of the bridgeovers is such that the fore and aft separation between the wheels 25 and 29 is fairly large, so that the implements follow well the contour of the land.

Instead of being asymmetrically arranged, an angled arrangement of bridgeovers may be used.

We claim:

1. A frame for mounting agricultural implements, which is foldable from an extended working condition to a folded travelling condition, comprising:
   a draw bar connectable at its front end to a tractor vehicle,
   an elongated support beam for carrying said agricultural implements, said beam having two side portions pivotably connected to each other at a center of the beam for folding movement in a horizontal plane,
   two links, each pivotably connected at a front end to said draw bar and at a rear end to a central part of a respective beam portion, and
   means connecting the center of the beam to the draw bar, said connecting means allowing the center of the beam to be held so spaced from the front end of the draw bar that the beam is extended with its side portions substantially aligned with each other, and said connecting means also allowing movement of the center of the beam in a fore and aft direction relative to the draw bar to cause folding of the beam portions about the rear ends of the links, whereby in the folded condition the beam portions extend substantially parallel to the draw bar.

2. A frame according to claim 1, wherein said connecting means includes power operated means for moving the beam center towards or away from the front end of the draw bar.

3. A frame according to claim 1, wherein said connecting means is arranged to cause forward movement of the beam center from a position in which the beam is extended, to a position which is close to the front ends of the links as measured in the fore and aft direction.

4. A frame according to claim 1, wherein said draw bar includes a rearwards extension on which said beam center is guided during movement from a rear to a front position.

5. A frame according to claim 1 wherein said beam portions are carried by center wheels arranged automatically to align themselves with the direction of movement of the parts to which they are attached.

6. A frame according to claim 1, wherein said beam is supported by wheels mounted both in front of the beam, and on rear wheels mounted behind the beam, said rear wheels being mounted by supports which are adapted to extend over agricultural implements intended to be carried by the beam.

7. A frame according to claim 6, wherein said rear wheel supports are hinged to allow rear portions thereof to swing in a horizontal plane relative to the beam.

8. A foldable frame for mounting agricultural implements, which is foldable from an extended working condition to a folded travelling condition, comprising:
 a draw bar having a rearwards extension,
 an elongated support beam for carrying said agricultural implements, said beam having two side portions mounted on caster wheels to allow movement in any direction over the ground,
 a wheel supported central sub-frame guided for movement along said rearwards extension, the inner ends of the beam portions being pivotably attached to said central sub-frame to allow relative movement in the horizontal plane,
 two links, each pivotably connected at one end to the draw bar and at the other end to a central part of a respective beam portion, and means for moving the sub-frame along the said rearwards extension from a rear position in which the central frame is so spaced from the front of the draw bar that the beam is extended with its side portions substantially aligned with each other, to a front position in which the said sub-frame in close to the front ends of the links in the fore and aft direction of the frame, said movement of the sub-frame causing folding of the beam portions about the rear ends of the links so that in the folded condition the beam portions extend rearwardly from the sub-frame.

9. A foldable frame according to claim 8, wherein in the folded condition of the frame, said central sub-frame fits between side members of the draw bar to which said one ends of said links are attached.

10. A frame according to claim 8, wherein each of said beam portions includes two sections connected by a hinge allowing relative vertical movement, and wherein the outer beam sections are braced by cables extending rearwardly from said draw bar.

11. A frame according to claim 10, wherein said caster wheels include a front wheel connected to each of the said beam sections and mounted in front of said sections, and a rear wheel connected to each of the two innermost beam sections and mounted by supports which are adapted to extend over agricultural implements carried by the beam.

12. A frame according to claim 11, wherein said rear wheel supports are hinged to allow rear portions thereof to swing in a horizontal plane relative to the beam.

* * * * *